(No Model.)  2 Sheets—Sheet 1.
C. W. HALE.
COMBINED COCK AND VALVE.
No. 372,314. Patented Nov. 1, 1887.
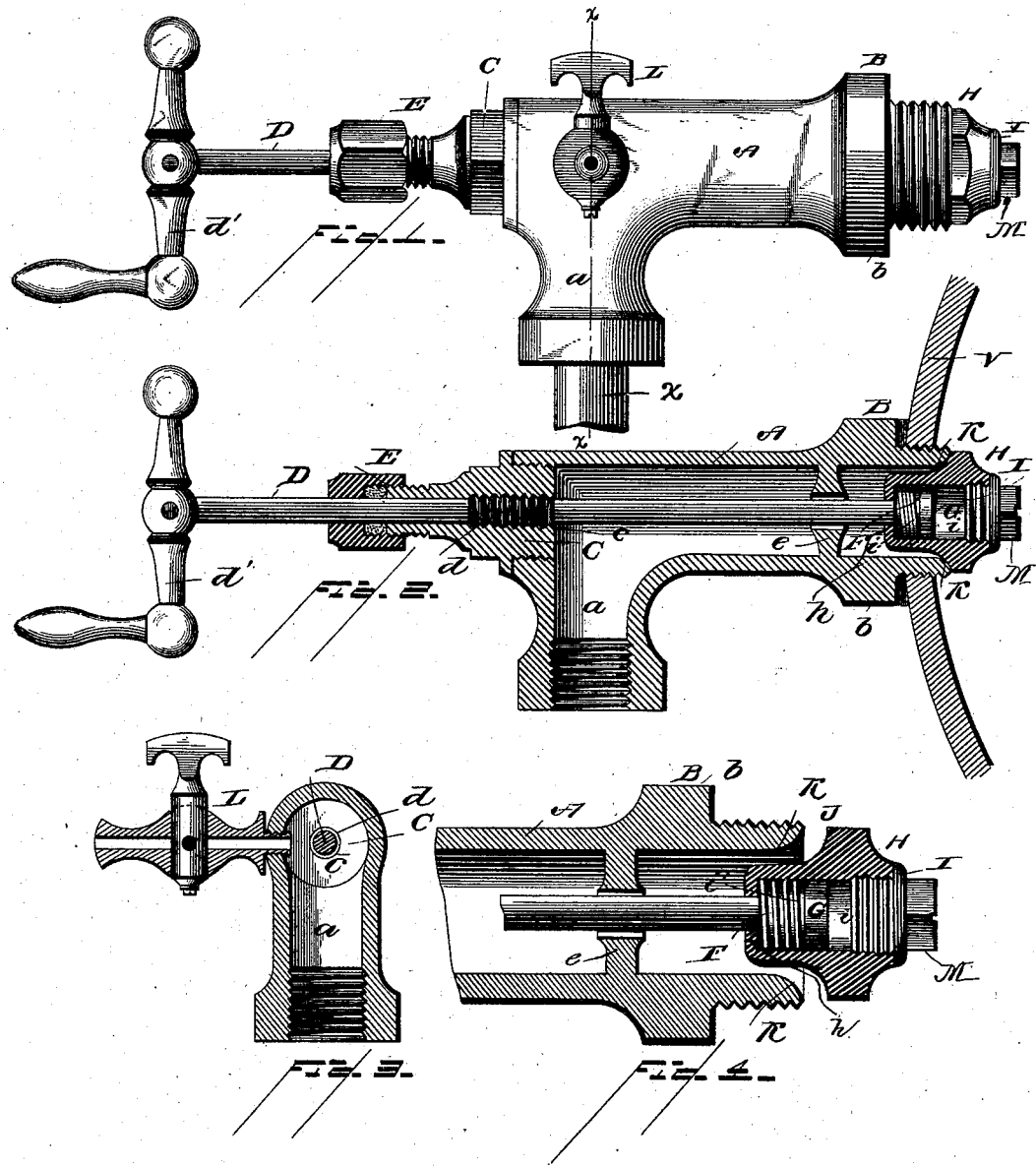
Witnesses
Inventor
Chas. W. Hale.
By his Attorneys (No Model.) 2 Sheets—Sheet 2.
C. W. HALE.
COMBINED COCK AND VALVE.
No. 372,314. Patented Nov. 1, 1887.
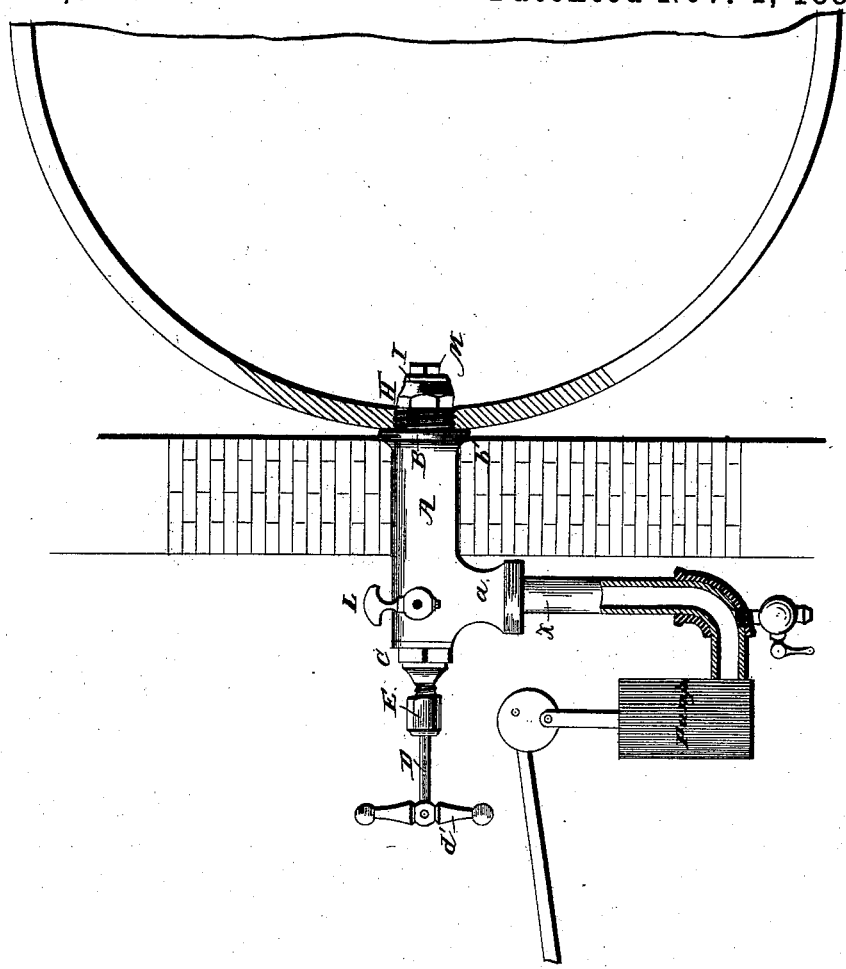
Witnesses
Geo. Thorpe.
Inventor
C. W. Hale
By his Attorneys

UNITED STATES PATENT OFFICE.

CHARLES WILLIAM HALE, OF EUREKA, KANSAS.

COMBINED COCK AND VALVE.

SPECIFICATION forming part of Letters Patent No. 372,314, dated November 1, 1887.

Application filed December 30, 1886. Serial No. 223,030. (No model.)

*To all whom it may concern:*

Be it known that I, CHARLES WILLIAM HALE, a citizen of the United States, residing at Eureka, in the county of Greenwood and State of Kansas, have invented a new and useful Improvement in a Combined Cock and Valve, of which the following is a specification.

This invention relates to improvements in a combined cock and valve, and is especially adapted for attachment to boilers and tanks, to prevent bursting by freezing in the pipes adjacent thereto. It can, however, be used for a variety of purposes, as is evident from the following portion of this specification.

The invention consists in the construction and novel arrangement of parts hereinafter described, illustrated in the drawings, and pointed out in the claims hereto appended.

In the accompanying drawings, Figure 1 represents a side view of the invention detached. Fig. 2 is a central longitudinal section of the device secured to a boiler or tank. Fig. 3 is a sectional view on the line $x\,x$, Fig. 1. Fig. 4 is a side detail sectional view of the end of the valve-stem and the valve-plug, showing the connection between the two. Fig. 5 is a view showing the device connected to a pump.

For convenience of reference in the following description I will call that end of my device which enters the tank the "inner" end, and the other end of the device I will term the "outer" end.

Referring to the accompanying drawings by letter, A designates the shell or casing of the valve, having at its outer end a side extension or branch, $a$, internally threaded at its end to engage with the threaded end of a receiving-pipe, X.

B is the inner end of the casing, externally threaded to engage in a suitable opening in the shell of a boiler or tank, V, as shown in Fig. 2.

$b$ is a circumferential flange around the casing, adjacent to its threaded inner end, between which flange and the shell of the boiler packing is placed to make the joint sufficiently tight. The outer end of the casing A is also internally threaded to receive the threaded end of a bearing block or piece, C, which is provided with a central longitudinal opening, $c$. A part of said opening $c$ is threaded to engage the threaded portion $d$ of the valve stem or spindle D, which passes through the opening $c$, and has detachably secured to its outer end the balanced crank-handle $d'$, by means of which it is screwed inward and outward with regard to the casing.

E is a stuffing-box screwing upon the outer end of the block C, and having its chamber packed in the usual manner to keep the passage-way of the valve-spindle sufficiently tight.

$e$ is a guide-bar extended diametrically across the interior of the casing A, near its inner end, and centrally perforated, so as to keep the motion of the inner portion of the valve-spindle, which passes through the said perforation, true and central.

The extreme inner part of the valve-spindle has an enlarged portion, F, and upon the end of the spindle is a disk or button, G, which fits snugly into a chamber of the valve-plug, hereinafter described.

H is the valve-plug, having through it a central circular opening, upon the outer end of which, on the end that enters the valve-casing, is an inwardly-extending circumferential flange, $h$, the edge of which fits against the outer end of the enlarged portion F of the valve-spindle. The inner end of the opening of the plug-valve is internally threaded for the engagement of the screw-plug I, between the end of which and the flange $h$ is formed the chamber $i$, in which the disk G fits and moves to and fro. This construction of the valve-plug will be found to be peculiarly advantageous. To secure the plug upon the spindle, the spindle is dropped through the plug and the screw-plug I then inserted. This operation, it will be seen, is extremely simple. If the valve-plug were solid on the inner end, the flange $h$ would necessarily be detachable, and the plug would consequently have to be heavier on its outer end, which would prevent the inner end or mouth of the casing being left open sufficiently to give proper clearance to the water.

$i'$ is a coiled spring surrounding the enlarged portion F of the spindle and situated between the disk G and the flange $h$, so as to prevent the disk from jarring against the flange.

The outer portion, J, of the valve-plug H has the contour of its periphery curved and converging to the outer end of the plug, or else made conical in the same direction, to fit accurately against the correspondingly-shaped inner orifice, K, of the valve-casing, and thus prevent any outflow when in contact. The inner portion of the plug can be shaped in any desirable manner. The said orifice K forms a seat for the valve-plug.

L is a discharge cock or valve, the upper end of which is threaded, so as to screw into a suitable threaded opening in the lower part of the valve-casing, and by means of which the valve-casing chamber can be emptied of its contents when the valve-plug H is tight on its seat K. By screwing the valve-spindle outward by means of its handle the valve-plug H may be drawn tightly on its seat, so that no water can escape from the boiler or tank into the valve-casing. Then by opening the escape-cock L the chamber of the valve-casing can be emptied of its contents, so that there will be no danger that the same or the pipes contiguous thereto will burst on account of freezing.

When the escape-cock L is closed, the action of the valve-spindle and the valve-plug H causes the device to act in the same manner as an ordinary stop-cock, either to cut off the water from the tank Y to the pipe X or to permit it to flow from the former to the latter. To cut off the water, the plug H is drawn tight against its seat by screwing the spindle outward, and to allow the water to flow the plug is moved inward in the tank by screwing the spindle inward. The valve-plug H, being capable of movement upon the disk on the end of the valve-spindle, will change its position according to the pressure in the boiler or tank when set so far within the same by screwing in the valve-spindle that it cannot rest upon its seat, so that it acts as a check to equalize the flow of water under varying pressures. When the pressure is less, it will move inward and give more clearance to the outflowing water, but when the pressure is greater it will be forced outward, so as to allow less clearance, so that about the same amount of water will flow out under all pressure. The amount discharged can be increased or diminished in quantity by setting the valve-plug farther in or out by means of the spindle, as described, so that the device is a gage-valve for the amount of water discharged.

It will be seen that the valve-plug has a movement upon the valve-spindle independent of the same, whereby it will automatically operate to open and close the end of the valve-casing, and also, as the spindle will rotate freely in the said plug, there will be no wearing away of the valve and the valve-seat, as would be the case were the valve to rotate with the spindle, as will be readily understood.

The pipe X may be connected to a pump for supplying water to the boiler, and when it is so connected my device can be utilized as a check-valve. To use it as a check-valve the spindle is turned inward until the disk G impinges against the end of the screw-cap M in the inner end of the valve, but not far enough to remove the valve from its seat. In this arrangement at every stroke of the pump which forces water into the boiler the valve will be moved from its seat and allow the water to pass into the boiler. On the reverse stroke of the pump the valve will resume its position on the valve-seat and prevent the outflow of the water then in the boiler. I may add that in this arrangement it will sometimes be necessary to make the valve-casing of a length sufficient to extend through a wall or other barrier, and such construction, it is obvious, will involve no departure from my invention.

Having thus described my invention, I claim—

1. The combination, with the casing having the orifice at its inner end, forming an external valve-seat, of the spindle movable longitudinally in the casing and having the enlargement F and disk G at its inner end, the centrally-apertured valve-plug adapted to move against said seat upon the outward movement of the spindle and having the inwardly-projecting flange $h$, fitting around the spindle in rear of the enlargement F, and the coiled spring $i'$, arranged around said enlargement and bearing against the disk G and the flange $h$, substantially as specified.

2. The combination of the valve-casing A, having the branch or extension $a$, the threaded inner end, B, the circumferential flange $b$, and the external valve-seat, the perforated bearing-block C, screwed into the outer orifice of the casing A and having a part, $c$, of its bore threaded, the stuffing-box E on the outer end of the block C, the valve spindle D, having a suitable handle on its outer end, a portion, $d$, of its shank threaded to engage the part $c$ of the bore of the block, and provided at its inner end with the enlarged part F and disk G, the perforated valve-plug H, provided with the flange $h$, the screw-plug I, and coiled spring $i'$, all constructed and arranged substantially as and for the purpose specified.

In testimony that I claim the foregoing as my own I have hereto affixed my signature in presence of two witnesses.

CHARLES WILLIAM HALE.

Witnesses:
W. S. ROBERTSON,
CYRUS BROOKOVER.